United States Patent
Allen

(10) Patent No.: US 7,540,644 B1
(45) Date of Patent: Jun. 2, 2009

(54) LCD OPTIC SHUTTER

(75) Inventor: David M. Allen, Blachly, OR (US)

(73) Assignee: Laughing Rabbit, Inc., Blachly, OR (US)

( * ) Notice: Subject to any disclaimer, the term of this patent is extended or adjusted under 35 U.S.C. 154(b) by 0 days.

(21) Appl. No.: 11/800,300

(22) Filed: May 3, 2007

(51) Int. Cl.
*F21V 7/04* (2006.01)

(52) U.S. Cl. .............................. 362/554; 345/84; 349/77

(58) Field of Classification Search ................ 362/559, 362/561, 554, 555; 349/62, 77, 83; 345/84, 345/87–88, 90
See application file for complete search history.

(56) References Cited

U.S. PATENT DOCUMENTS

| | | | | |
|---|---|---|---|---|
| 4,978,952 | A * | 12/1990 | Irwin | 345/102 |
| 5,838,865 | A * | 11/1998 | Gulick | 385/121 |
| 6,040,936 | A * | 3/2000 | Kim et al. | 359/245 |
| 2004/0141335 | A1* | 7/2004 | Lee et al. | 362/555 |
| 2007/0153155 | A1* | 7/2007 | Chung et al. | 349/58 |
| 2007/0231596 | A1* | 10/2007 | Spindler et al. | 428/690 |
| 2008/0062713 | A1* | 3/2008 | Dwyer et al. | 362/605 |

\* cited by examiner

*Primary Examiner*—Ali Alavi
(74) *Attorney, Agent, or Firm*—Black Lowe & Graham PLLC

(57) ABSTRACT

A low cost fiber optic lighting display system includes a light source, an electronic shutter having independently controllable pixel elements positioned proximate to the light source, a controller for controlling the pixels, and a plurality of optical fibers, each fiber having input and output ends with the input end of each fiber positioned proximate to the output side of a pixel element or group of pixel elements. The corresponding method includes providing a fiber optic lighting display having a light source, an electronic shutter having independently controllable pixels, a controller connected to the electronic shutter for controlling the pixels, and a plurality of optical fibers, each optical fiber having an input end positioned proximate to a pixel or group of pixel elements and an output end. The method further includes positioning the output ends of the optical fibers adjacent to a viewing surface, illuminating the light source, and activating the controller to produce an image on the viewing surface.

17 Claims, 3 Drawing Sheets

LCD OPTIC SHUTTER

TECHNICAL FIELD

The invention relates generally to lighting display devices, systems and methods. More specifically, the invention relates to optical fiber lighting displays.

BACKGROUND OF THE INVENTION

Displays using multiple optical fibers typically have a light source for each fiber. Additionally, lighting displays in clothing typically use arrays of light sources to produce images. For example, The January 2007 edition of *I.E.E.E. Spectrum* magazine discloses a product called Lumalive™ by Philips Photonics Textiles research group which uses 100 light emitting diodes (LEDs) to produce a computer controlled, ASCI test message on a garment such as a shirt. These approaches are disadvantageous because they are costly, relatively heavy, and require a significant amount of power to operate. Accordingly, there is a need for a less costly, lighter weight lighting display with low power requirements.

SUMMARY OF THE INVENTION

It is therefore an object of the present invention to provide for a low cost, lightweight lighting display with low power requirements. The invention achieves the above objects and other objects and advantages which will become apparent from the description which follows, by providing a fiber optic lighting display system and method that does not use a separate light source for each fiber or an array of light sources to produce images. The system includes a single light source, an electronic shutter having a plurality of independently controllable pixel elements alternately changeable between relatively transparent and opaque states positioned proximate to the light source, a controller operatively connected to the electronic shutter for controlling the pixel states to generate a shutter image, and a plurality of optical fibers, each fiber having input and output ends with the input end of each fiber positioned proximate to the output side of a pixel element or group of pixel elements.

In preferred embodiments of the invention, output ends of the optical fibers are spread apart with respect to the input ends. The light source may be a low power light emitting diode (LED), and the electronic shutter may be a liquid crystal display (LCD).

In an additional aspect of the invention, the method includes providing a fiber optic lighting display having a light source, an electronic shutter having a plurality of independently controllable pixel elements, a controller connected to the electronic shutter for controlling the pixels, and a plurality of optical fibers, each optical fiber having an input end positioned proximate to a pixel element or group of pixel elements and an output end. The method further includes positioning the output ends of the optical fibers farther apart than the input ends adjacent to a viewing surface, illuminating the light source, and activating the controller, whereby a low resolution controllable bit mapped image can be produced for viewing on the viewing surface which is larger than a high resolution bit mapped image generated on the shutter.

DETAILED DESCRIPTION OF THE PREFERRED EMBODIMENTS

Figure 1:
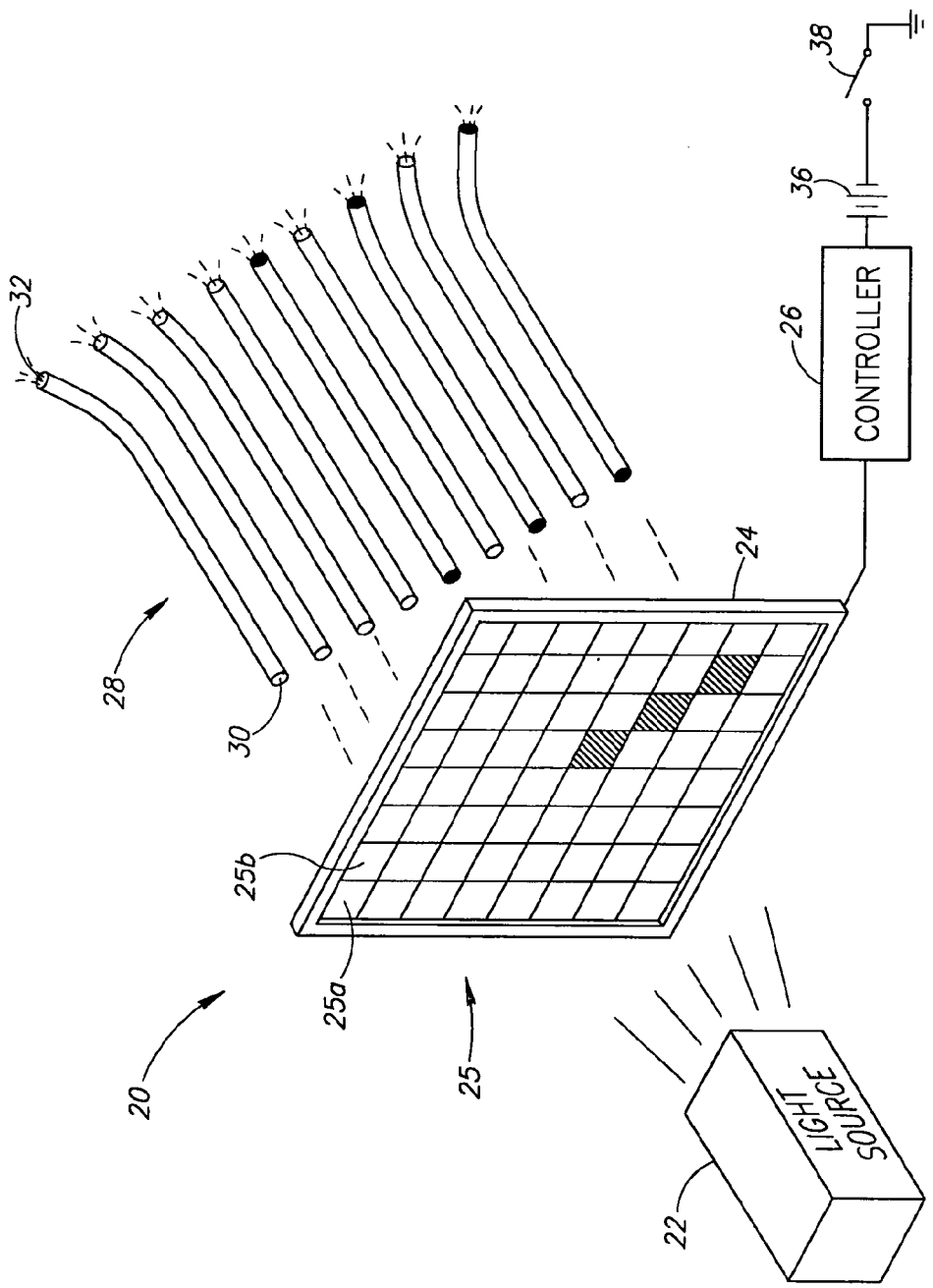
FIG. 1 is an exploded, perspective view of an optical fiber display system formed in accordance with an, embodiment of the invention.

An optical fiber display system in accordance with the principles of the invention is generally indicated at reference numeral 20 in the various figures of the attached drawings wherein numbered elements in the figures correspond to like numbered elements herein.

As best seen in FIG. 1, the display system 20 includes a light source 22 and a spread apart electronic shutter 24. The electronic shutter 24 includes a matrix of independently controllable pixel elements 25 alternately changeable between relatively transparent and opaque states. The electronic shutter 24 also defines an input side 25a adjacent to the light source 22 and an output side 25b facing away from the light source with each of the pixel elements 25 defining corresponding input and output sides. The input side of the shutter 24 is positioned proximate to the light source 22. The light source 22 may be optically coupled to the shutter 24 by optics (not shown) in the conventional manner. However, in other low cost embodiments, optics are not used. A controller 26 (e.g. a conventional micro controller) is operatively connected to the electronic shutter 24 for controlling the pixel states to generate a shutter image. A plurality of optical fibers 28, each having input ends 30 and output ends 32 has the input end of each fiber positioned proximate to the output side of a pixel element. Alternatively, an input end 30 may be associated with a group of pixel elements which is a subset of all of the pixel elements of the shutter 24. As used herein, the term pixel element also includes a group of pixel elements as defined herein. The shutter 24 is shown with three of the pixel elements 25 in a relatively opaque state, resulting in three of the optical fibers 28 having darkened input and output ends.

The optical fibers 28 are shown spaced apart from the shutter 24 so the input ends 25a can be seen, but in practice, the input ends are positioned more closely to the output side 25b of the pixel elements, such as by using an adhesive that allows the passage of light, or by using a clamp (not shown). In the preferred embodiment, the output ends 32 of the fiber optic fibers 28 are spread farther apart than the input ends 30 so the output ends of the optical fibers 28 form a bitmapped image larger than the shutter 24. In this way, the invention can advantageously generate a large bit mapped image from a very small shutter. The system 20 receives power from a power supply such as AA batteries 36 or any other source of power and may include a conventional housing (not shown) for containing the light source 22, shutter 24, and controller 26. The system 20 may also include an on/off switch 38.

Specific implementations of the components in the system 20 vary in different embodiments. In one preferred embodiment, the light source 22 is a single light emitting diode (LED), the electronic shutter 24 includes a monochrome liquid crystal display (LCD) having pixel elements, and the input end of each of the optical fibers 28 is positioned proximate to a single pixel element. However, in other embodiments, the light source 22 is not a single LED, but may include more than one LED, an incandescent light, or a fluorescent lamp, for example. The LED may be an integrated unit with individual Red, Blue Green elements on a single die, or on multiple dies in a single package. Additionally, the shutter 24 includes a color LCD in alternative embodiments. Further, the input ends of each of the optical fibers 28 are positioned proximate to groups of pixel elements in some embodiments, thus allowing brightness control by selectively setting differing numbers of the pixel elements in a particular group proximate to an input end to be relatively transparent.

Figure 2:
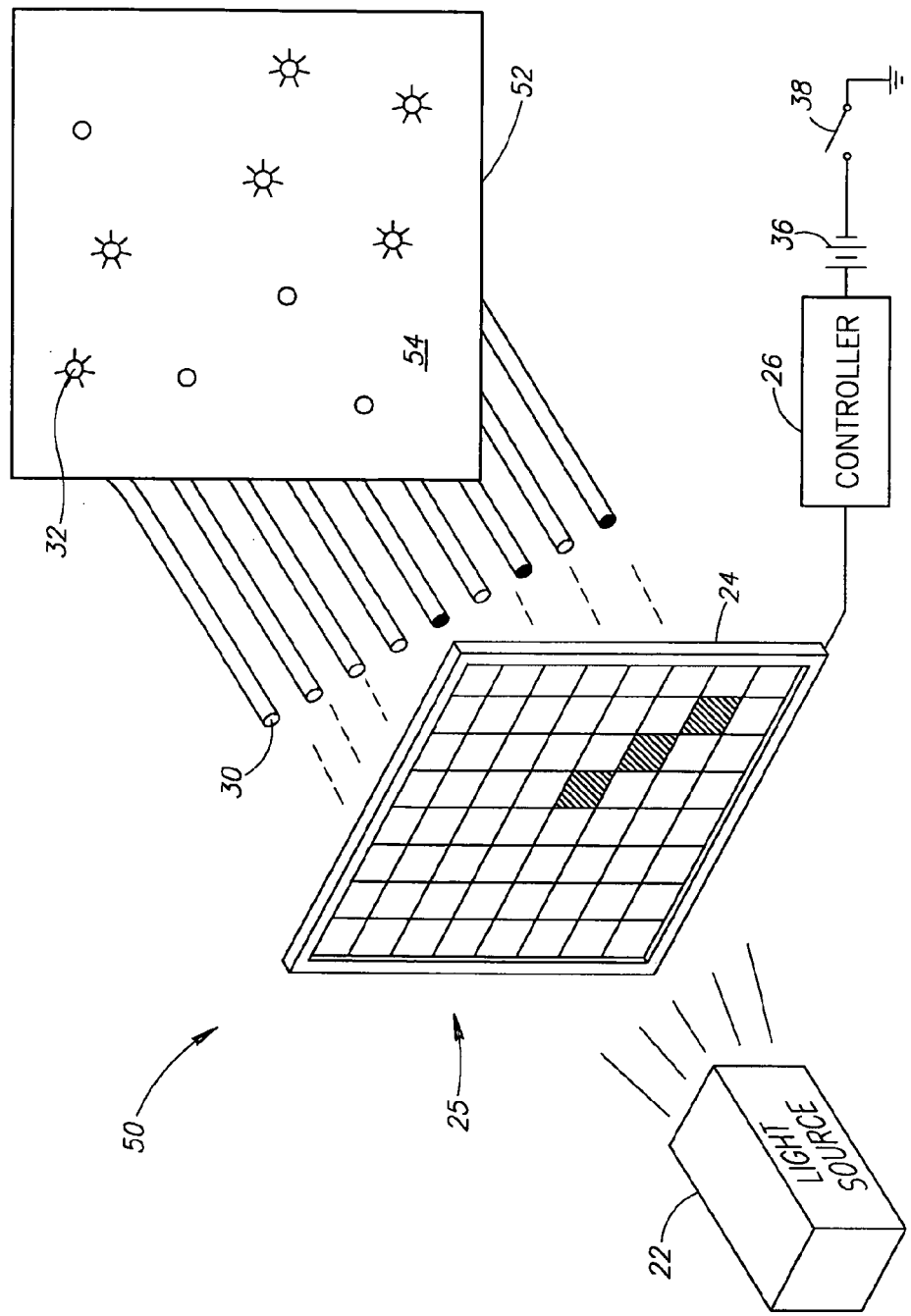
FIG. 2 is an exploded, perspective view of an optical fiber display system including a display surface.

FIG. 2 is a diagram of an optical fiber display system 50 that is similar to the system 20 shown in FIG. 1, but also includes a display surface 52 having a first side 54 and an obverse second side. The first side 54 of the display surface 52 is positioned adjacent to the output ends 32 of the optical fibers 28. In an example embodiment, the display surface 52 allows at least some of the light emitted from the optical fibers 28 to pass, thus allowing an image to be viewed on the second side. However, in other embodiments, the optical fibers 28 pierce the display surface 52 from the first side 54 to the obverse second side so that a viewer sees the output ends of the optical fibers 28 directly from the second side of the display surface 52. In an example embodiment, the system 50 is structured such that simulated constellations are produced on the display surface 52. One light source 22 is able to light the stars of the constellations. Additionally, the controller 26 adds a twinkle effect to selected stars by controlling the pixel elements 25 in the shutter 24 to periodically interrupt the light passing through the individual optical fibers 28.

Figure 3:
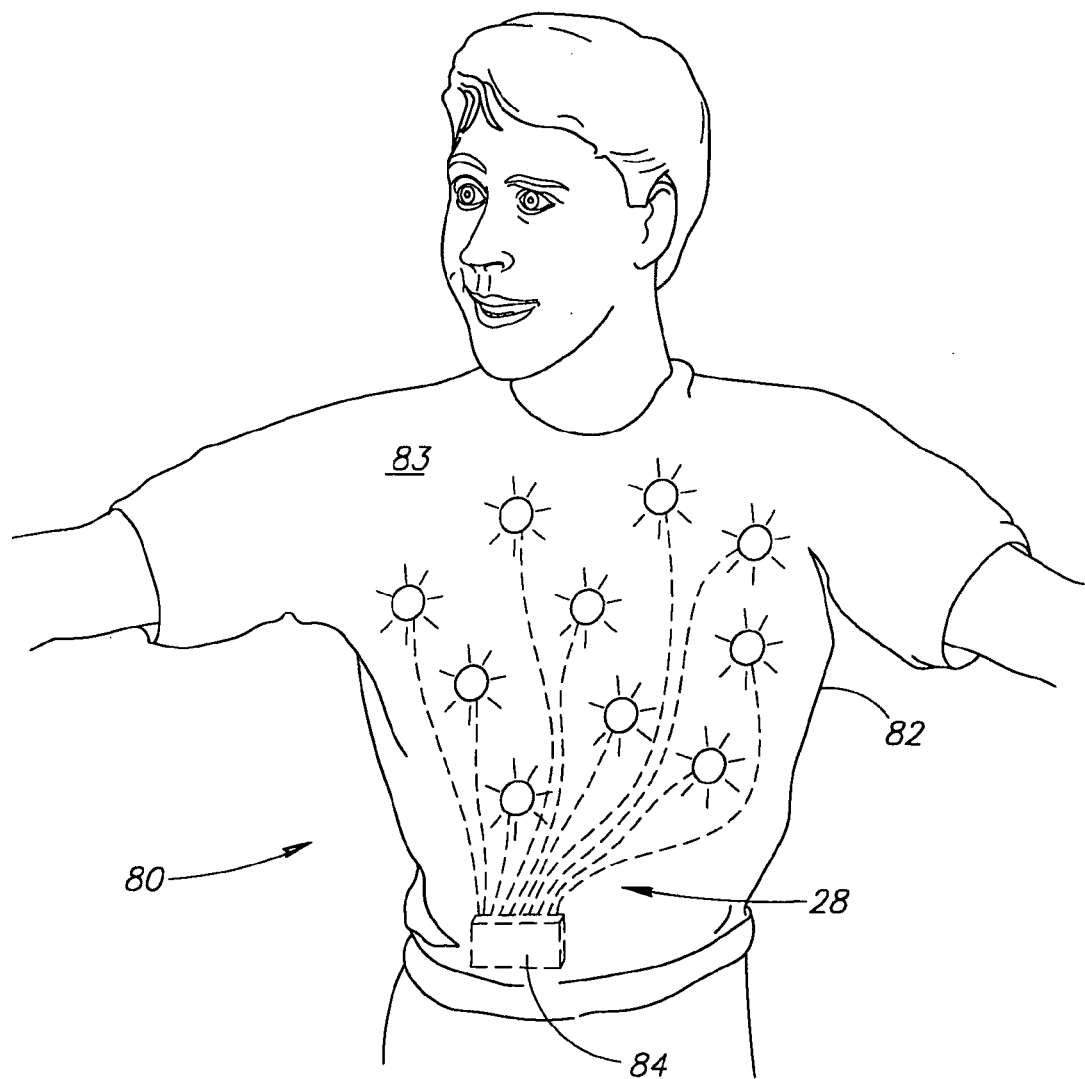
FIG. 3 is a diagrammatic representation of an optical fiber display system including an article of clothing as a viewing surface.

FIG. 3 is a diagram of an optical fiber display system 80 that is similar to the system 20 shown in FIG. 1, but also includes an article of clothing 82 which is not completely opaque having an inside surface and an outside surface 83 that is used in a similar manner to the display surface 52 of the system 50 shown in FIG. 2. Although the individual components are not shown for clarity, the dashed box 84 includes the light source 22, the electronic shutter 24, the controller 26, and the power source 36. The optical fibers 28 have their output ends 32 positioned proximate to the inside surface of the clothing 82 in such a way that light emitted from the output ends can be seen by a viewer looking at the outside surface 83 of the clothing 82. Use of a single light source 32 and a controllable shutter 25 allows a very small device to be used to produce a large display rather than using an array of LEDs. For example, a single 5 millimeter LED light source using an LCD shutter approximately the same size as the LED is able to accommodate approximately sixty 0.5 millimeter fibers for use in a display. The use of even smaller fibers allows more points to be used in an image. The pixel sizes of the LCD shutter are chosen to correspond to the size of the optical fibers being used.

In an additional embodiment, the system 80 is structured to allow the lighting display to be removed from the clothing 82 and re-inserted after the clothing 82 has been laundered. In an example embodiment, the system 80 includes a removable viewing surface (not shown) structured similarly to the viewing surface 52 shown in FIG. 2 that is positioned proximate to the inside surface of the clothing 82 when the lighting display is inserted, but that keeps the output ends of the optical fibers 28 in generally fixed positions relative to each other so that a user need not arrange the output ends individually when re-inserting the lighting display in the clothing 82 after washing. The inventive lighting system can also be applied to substrates other than clothing and paper such as walls, concrete substrates, etc.

Those of ordinary skill in the art will conceive of other alternate embodiments of the invention upon reviewing this disclosure. Thus, the invention is not to be limited to the above description, but is to be determined in scope by the claims which follow.

I claim:

1. A fiber optic lighting display, comprising:
   a light source;
   an electronic shutter having a plurality of independently controllable pixel elements alternately changeable between relatively transparent and opaque states, the electronic shutter also defining input and output sides and each pixel element defining corresponding input and output sides, wherein the input side of the shutter is positioned proximate to the light source;
   a controller operatively connected to the electronic shutter for controlling the pixel states to generate a shutter image; and
   a plurality of optical fibers, each fiber having input and free output ends, the input end of each fiber positioned proximate to the output side of a pixel element, wherein the output ends of the fiber optic fibers are spread farther apart than the input ends, so that the free output ends of the optical fibers form a bit mapped image larger than the shutter.

2. The lighting display of claim 1, wherein the light source is a single light emitting diode (LED).

3. The lighting display of claim 1, wherein the electronic shutter includes a liquid crystal display (LCD) having the pixel elements.

4. The lighting display of claim 3, wherein the LCD is a color LCD.

5. The lighting display of claim 1, including a viewing surface defining a front side and a back side, the output ends of the fibers illuminating the surface from the back side to the front side, whereby an individual viewing the display from the front side of the viewing surface sees light selectively emitted from the output ends of the fibers against the remaining portion of the viewing surface.

6. The lighting display of claim 5, wherein the output ends of the optical fibers illuminate the surface in patterns corresponding to constellations that appear in the night sky whereby falling stars, comets or even the natural twinkle of the stars may be simulated.

7. The lighting display of claim 5, wherein the viewing surface is part of an article of clothing having an exterior surface, the output ends of the optical fibers positioned proximate to the exterior surface.

8. The fiber optic lighting display of claim 1 further comprising:
   a viewing surface defining a front side and a back side, the output ends of the fibers illuminating the surface from the back side to the front side in patterns corresponding to constellations of stars that appear in the night sky,
   wherein the light source is a single light emitting diode (LED) and wherein the electronic shutter includes a liquid crystal display (LCD) having the pixel elements.

9. The lighting display of claim 8, wherein the controller is configured to add a twinkle effect to selected stars.

10. The lighting display of claim 9, wherein the controller is configured to add a falling star simulation to the display.

11. A method of emitting light from a display, comprising:
   providing a fiber optic lighting display having a light source, an electronic shutter having a plurality of independently controllable pixel elements, a controller connected to the electronic shutter for controlling the pixels, and a plurality of optical fibers, each optical fiber having an input end positioned proximate to a pixel element and an output end;
   positioning the output ends of the optical fibers farther apart than the input ends adjacent to a viewing surface;
   illuminating the light source; and activating the controller, whereby a controllable bit mapped image can be produced for viewing on the viewing surface.

12. The method of claim 11 wherein the output ends of the optical fiber can spread further apart than the input ends so that the produced viewing image is larger than the bit mapped image generated on the shutter.

13. The lighting display of claim 12, including:
means for positioning free ends of the light conducting means with respect to a viewing surface.

14. The method of claim 12 wherein the controllable bit mapped image includes patterns corresponding to constellations that appear in the night sky.

15. The method of claim 14 wherein the controllable bit mapped image includes a twinkle effect for selected stars.

16. The method of claim 15 wherein the controllable bit mapped image includes a falling star simulation.

17. A lighting display, comprising:
lighting means for generating light;
shutter means optically coupled to the lighting means for generating a high resolution bit mapped shutter image using a plurality of independently controllable elements to selectively allow transmission of the light through each element;
controller means for controlling the plurality of elements; and
light conducting means optically coupled to the shutter means for conducting light from the elements so that light transmitted through the shutter is conducted by the light conducting means to generate a distal, larger, lower resolution bit mapped image corresponding to the shutter image.

* * * * *